United States Patent Office 2,899,016
Patented Aug. 11, 1959

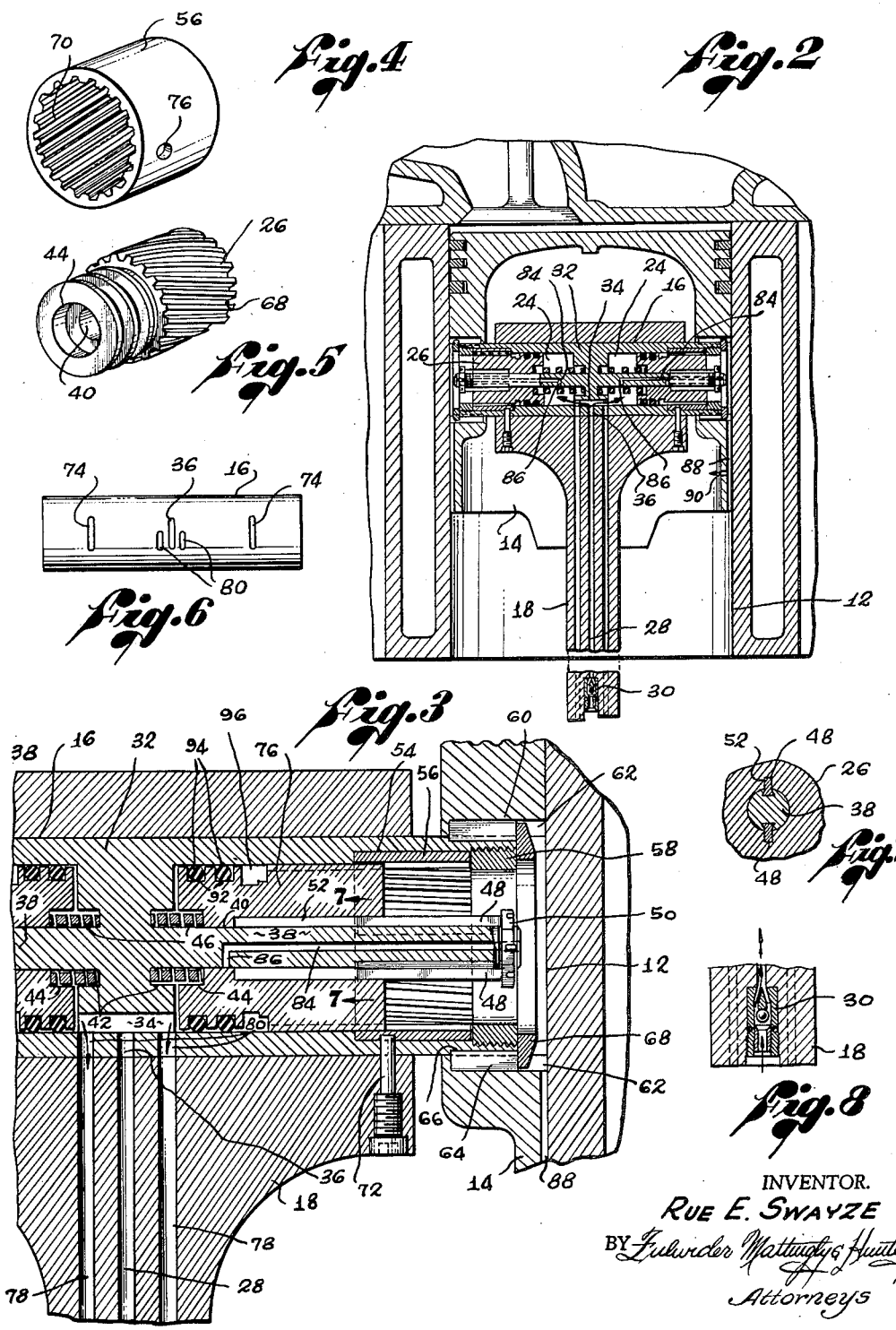

2,899,016

ENGINE LUBRICATING SYSTEM

Rue E. Swayze, Rosamond, Calif.

Application November 3, 1958, Serial No. 771,434

12 Claims. (Cl. 184—6)

The present invention relates generally to reciprocating engines and more particularly to a mechanism for pressurized lubrication of parts of reciprocating engines.

An object of my invention is to provide a pumping mechanism for lubricating pistons, piston pins, crank pins or other parts in reciprocating engines or to provide a cooling oil flow to such parts.

Another object of the invention is to provide a lubricant pump of a compact simplified construction particularly adapted for mounting within a wrist pin of a reciprocating engine to provide a flow of lubricating or cooling oil through suitable passage means to the several bearing surfaces of the engine parts.

Yet another object of the invention is to provide a lubricating mechanism of this type which will provide pressurized lubrication of bearing surfaces and particularly the crank pin surfaces in a timed relationship with the cycle of the engine so as to create a pressurized lubricant film adapted to dampen shocks on the crank pin.

A further object of the invention is to provide a lubricating mechanism of this type for inclusion in reciprocating engines without involving radical alteration of engine design.

These and other objects and advantages of my invention will be apparent from the following description when taken into conjunction with the annexed drawings showing a presently preferred embodiment of my invention in which:

Figure 2 is a sectional view on a greatly enlarged scale taken axially of one of the cylinders of the engine in Figure 1 and on the longitudinal axis of the wrist pin assembly;

Figure 3 is a partial axial sectional view of the wrist pin assembly of Figure 2 on a still further enlarged scale illustrating another position of the parts of the pump mechanism;

Figure 4 is a detailed perspective view on an enlarged scale of an annular camming element of my pump mechanism;

Figure 5 is a detailed perspective view of a pump piston of my pumping mechanism;

Figure 6 is a bottom plan view of a hollow wrist pin of the pumping mechanism;

Figure 7 is a sectional view taken on the line 7—7 of Figure 4; and

Figure 8 is a sectional view of a check valve means in the connecting rod.

Figure 1:
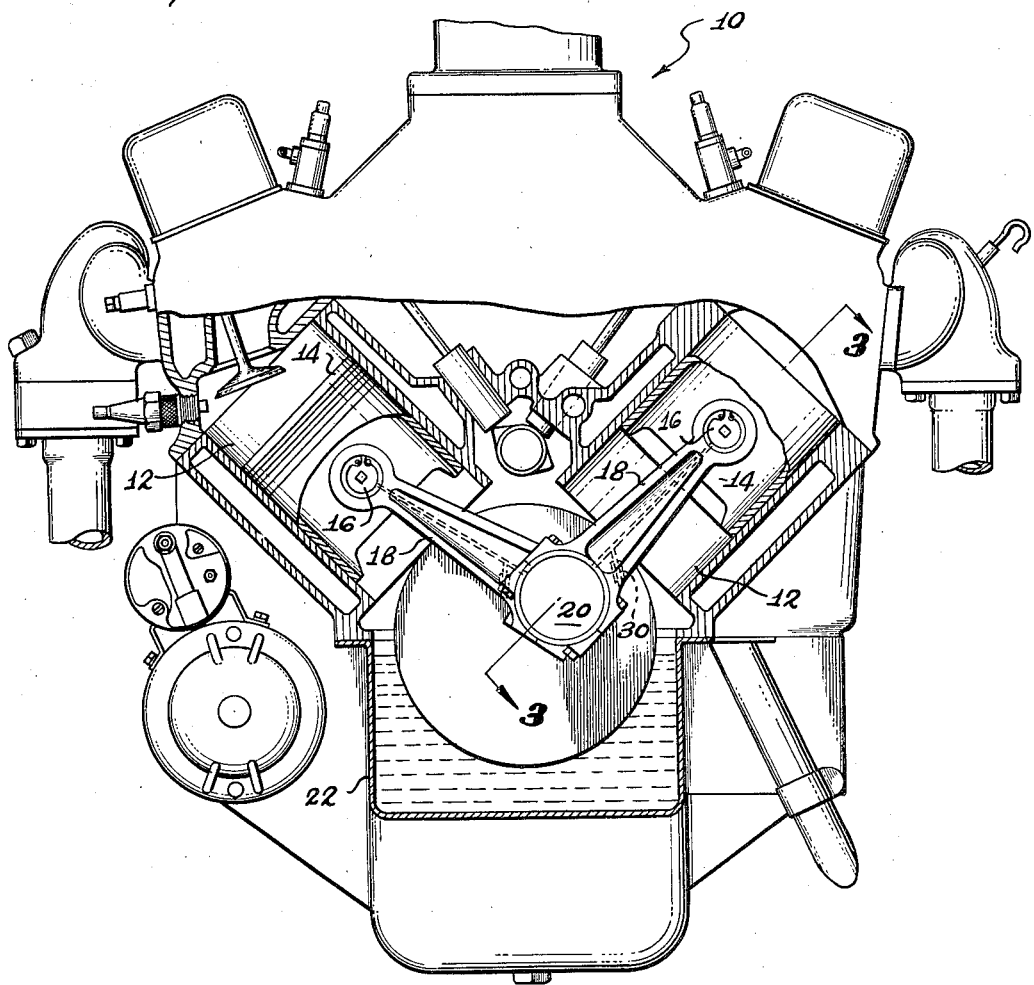
Figure 1 is an end view of an engine incorporating my invention with portions thereof cut away and other portions shown in vertical section.

In the drawings I have illustrated my invention as being embodied in an automotive diesel engine of the V type and having a wet sump. It will be appreciated however that this is by way of example and the invention can equally well be incorporated in other types of diesel, gasoline or other types of reciprocating engines of other configurations and with either wet or dry sumps.

In the drawings there is illustrated a diesel engine 10 of the V type having two rows of cylinders 12 that mount reciprocatory pistons 14. Within their skirts the pistons 14 mount hollow wrist pins 16 which provide bearings for the upper end of connecting rods 18. In this instance, since the engine 10 is of the V type, each crank pin 20 of the crank shaft provides a bearing for lower ends of two connecting rods 18.

The general arrangement just described is conventional. In addition, it will be understood that the crank shaft is provided with passages to conduct the lubricating oil therethrough to the crank pin bearings and these passages may be either drilled diagonally from the center of the main journals to the centers of the crank pins, or by drilling holes axially through the centers of the main journals and pins and then drilling passages through the webs at right angles to these. As is usual, the engine 10 includes a lubricating pump (not shown) adapted to force lubricating oil through the crank shaft passages and this pump may be located in a wet sump 22, or alternatively may draw oil from a separate supply reservoir as is well understood in the art. In my invention the pressure lubricating mechanism which is mounted in wrist pin 16 will find its source of lubricating oil by drawing such oil directly from the crank pin bearing surfaces or by direct collection or intake from the wet sump 22.

The general arrangement of my pump mechanism is best seen in Figure 2. The hollow wrist pin 16 is divided into a pair of pump chambers 24 at opposite ends of the wrist pin that axially slideably contain a pair of reciprocable pump pistons 26. In the illustrated embodiment of my invention the wrist pin 16 is angularly immobile relative to the connecting rod 18 and accordingly the connecting rod 18 undergoes an oscillatory angular movement relative to the wrist pin. The pump pistons 26 are also adapted to be rotationally immobile relative to the wrist pin 16 and are capable only of axial slideable movement within the wrist pin. In order to translate relative movement of the connecting rod 18 into axial reciprocation of the pump pistons 26, I utilize a cam means interconnecting these two parts whereby oil is forced under pressure through suitable passage means in order to accomplish lubrication or cooling of the engine parts.

More specifically the connecting rod 18 is formed with a longitudinally extending lubricant intake passage 28 such as is found in many conventional connecting rods and is provided at its lower end opening with a check valve 30 adapted to pass the lubricant upwardly through the connecting rod. In Figure 1 the check valve 30 is shown as offset from the main passage 28. When my invention is incorporated into an engine having a wet sump the check valve 30 is adapted to open and admit the lubricant from the wet sump 22 on a downstroke of the piston 14. However an alternate arrangement is shown in Figure 2 wherein a check valve 30 opens into the crank pin bearing and has its source of lubricant in the lubricating oil from an aligned oil passage bored in the crank shaft and fed by the lubricating oil pump.

The wrist pin 16 is formed with a central wall portion 32 which divides the interior of the wrist pin into the pair of pump chambers 24. An axially extending intake passage 34 is formed through the wall 32 to intercommunicate the pair of pump chambers 24 with a radially extending intake port 36 that is formed in the wrist pin 16 in alignment with the upper end of the intake passage 28 of the connecting rod 18. As can be seen in Figure 6, the intake port 36 takes the form of a slot that is adapted to register with the passage 28 throughout the range relative oscillatory movement of the connecting rod 18 relative to the wrist pin 16. However, in lieu of this arrangement and to replace the check valve 30, the port 36 can be formed with a lesser length such that it is in fluid communicating registration with the passage 28 only during the upstroke of the piston 14, at which time the pump pistons 26 are undergoing their intake stroke.

In order to provide a guide means for the reciprocable pump pistons 26, the central wall 32 of the wrist pin 16 is formed with a pair of axially oppositely extending guide stems 38 which are coaxially disposed relative to the longitudinal axis of the wrist pin 16. The pump pistons 26 are formed with central bores 40 adapted to slideably support the pump pistons on the guide stems 38. The confronting faces of the central wall 32 and inner end faces of pistons 26 are formed with annular spring pockets 32 and 34, respectively, providing abutments for a pair of coil springs 46, which yieldably bias the pump pistons 26 towards the outer ends of the wrist pin 16 and serve to dampen any vibratory movement of the pump pistons 26.

At their outer end portions the guide stems 38 mount a pair of diametrically opposite keys 48 that are held against axial movement by a castle nut 50 threadedly mounted on the extreme outer end portion of each guide stem 38. These keys are receivable within complementarily disposed keyways 52 formed in the axial bore 40 of pump pistons 26 whereby the pump pistons are held against rotational movement relative to the wrist pin 16, while at the same time permitting axial reciprocation of the pump pistons 26 between the inner ends of the keys 48 and the central wall 32.

The wrist pin 16 at both ends is formed with a counterbore 54 adapted to rotatably seat an annular camming element 56. An externally threaded ring nut 58 is threadedly engaged with internal thread means formed in each of the counterbores 54 for locking the camming element 56 in place against axial movement while at the same time permitting rotational movement of the camming elements. For mounting the wrist pin 16 in the piston 14 the skirt of the piston at diametrically opposite positions is formed with coaxial bores 60 each of which is provided with diametrically opposite keyways 62. A pair of keys 64 are disposed in the keyways 62 and seated in complementary keyways 66 externally formed in the opposite ends of the wrist pin 16 whereby the wrist pin is held against rotational movement. A snap ring 68 is provided to lock the ring nut 58 and keys 64 in place.

It will be apparent that since the pump pistons 26 are held against rotational movement while the camming elements 56 are capable of rotational movement relative to the wrist pin 16 that a cam means interconnecting these two parts will cause axial movement of the pump pistons 26 to force a lubricant through the pump chambers 24. This can be accomplished in a number of ways, as for example, by providing a single cam surface on the exterior of the pump pistons 26 and a single driving member on each of the cam elements 56. However in order to reduce the unit stresses involved I have adopted the configuration of the camming member 56 and pump pistons 26 seen in Figures 4 and 5. Thus, the outer end portions of the pump pistons 26 take the form of an external helical or spiral gear 68. The gear means 68 is relatively closely pitched and is complementary to an internal gear means 70 formed in the rotatable camming member 56.

In order to translate oscillatory movement of the connecting rod 18 into axial reciprocation of the pump members 26 the connecting rod at its upper enlarged bearing end carries a pair of drive pins 72 such as are best seen in Figure 3. These drive pins are disposed radially with respect to the axial center line of the wrist pin bearing bore of the connecting rod and are slideably received through a pair of slots 74 formed adjacent opposite ends of the wrist pin 16 (Figure 6). As is indicated in Figure 4, each of the camming members 56 is formed with a hole 76 adapted to seat the inner end of one of the drive pins 72. Thus, as the connecting rod 18 oscillates, the drive pins 72 are concurrently oscillated through the slots 74 to drivingly oscillate the camming member 56. As a result, the pump pistons 26 are driven into axial reciprocation in order to alternately cause intake and exhaust of the lubricating medium through the pump chambers 24.

The lubricant which is pumped by the pumping mechanism just described can be distributed by suitable passages and ports to several of the relatively moving parts of the engine, for cooling, or for lubrication, or in order to dampen shock loads. For example, a suitable porting arrangement can be provided through the upwardly facing wall portion of the wrist pin 16 for distributing jets or a stream of cooling oil from the pump chambers 24 to the interior of the piston 14 for cooling the piston head. Alternatively, or in conjunction with such cooling means, cylinder wall and piston lubrication can be provided by providing suitable passages from the pump chambers 24 which exhaust onto the cylinder wall. Yet another arrangement is the provision of suitable lubricant passages for conducting pressurized lubricant to the crank pin in order to provide a film of oil on the crank pin under suitable pressure adapted to withstand shock loads thereon. While not all of the possible lubricant passages are specifically disclosed herein the feasibility of these alternative arrangements will be apparent by a specific description of some of them.

On the downward firing stroke of the piston 14 a considerable shock load is imposed on the crank pin 20. When it is desired to dampen the force of this shock load my pumping mechanism can be utilized to provide a pressurized film of lubricant on the crank pin bearing. For this purpose the connecting rod 18 is provided with a pair of longitudinally extending lubricant exhaust passages 78 that extend from the wrist pin bearing to the crank pin bearing of the connecting rod. These exhaust passages may be disposed on opposite sides of the intake passage 28 and at their upper ends terminate in alignment with a pair of exhaust ports 80 formed in the wall of the wrist pin 16 on opposite sides of the intake port 36. As can be seen from Figure 3 the exhaust ports 80 have communication through passage 34 with the pump chambers 24.

As is indicated in Figure 6 the exhaust ports 80 take the form of slots which are of approximately half the length of the intake port 36. The intake port 36 describes an arc which includes the entire range of oscillatory movement of the connecting rod 18. The exhaust ports 80 however subtend a length of approximately one-half the oscillatory range of movement of the connecting rod 18 and are adapted for registration with the exhaust passages 78 of the connecting rod only during the downstroke of the piston 14. With this arrangement a check valve means is provided which will prevent a backflow through the exhaust passages 78 of any lubricant whenever the pump pistons 26 are in their intake strokes.

It will be apparent that a variety of valving arrangements are possible by appropriate spacing of the ports 80 and 36. For example by reversing the camming direction of one of the pump pistons 26 the pair of pump pistons 26 can be adapted to undergo axial co-movement rather than the opposed axial movement of the illustrated arrangement. Thus, if one of the exhaust ports 80 is reversed or moved to the opposite side of a longitudinal center line of the wrist pin 16 from the other exhaust port 80 an arrangement will be provided wherein each of the pump pistons 26 serves a separate bearing surface which it is desired to lubricate, or perhaps to cool in a timed realtionship. It will also be apparent that the exhaust ports 80 can be of the same length as the intake port 36 and suitable check valves provided in the passages 78.

In order to provide for lubrication of the cylinder wall and piston each of the guide stems 38 is provided with an axially extending central passage 84 opening into the outer end faces of the guide stems. At its inner end each passage 84 terminates in a radially extending port 86 that has communication with a pump chamber 24. Comparing the position of one of the pump pistons 26 in Figure 3 and Figure 4 it will be seen that the port 86 is adapted to be closed during a portion of the pumping or inward stroke of the pump piston. The passage 84 is thus open to the pump chamber only during a portion of the pumping cycle of the pump piston 26 whereby a portion of the lubricant is diverted outwardly through the passage 84 and onto the cylinder 12. Some of the oil thus delivered to the cylinder wall splashes back on to the pump mechanism parts to provide lubrication for these parts.

In order to avoid any unwanted pressure buildups within the wrist pin 16 outwardly of the outer ends of the pump pistons 26, the skirt of the piston 14 is provided with vertically extending grooves 88 that extend downwardly from the wrist pin bearing. For each groove 88 a hole 90 is radially formed through the skirt of the piston at the lower end of the groove to relieve pressures to the interior of the piston at a point above a piston ring at the lower end of the piston, if present.

Each of the pump pistons 26 at its inner end is formed with a pair of circumferentially extending grooves 92 adapted to receive O-rings 94 which provide a seal against the walls of the chambers 24 to prevent the escape of fluid pressure from the chambers. Behind the seal rings 94 an annular cavity 96 is formed in each pump piston 26 to provide a reservoir of lubricant to reduce friction between the pump pistons and the wrist pin.

The operation of my pump mechanism is as follows: The intake passage 28 of the connecting rod 18 receives lubricant through the check valve 30 at its lower end. This lubricant, depending upon the type of engine, has its source either in the wet sump 22 or is collected directly from the crank pin bearing, to which bearing it is supplied by a conventional lubricant pump.

During an upstroke of the piston 14 the pump pistons 26 are caused to move axially outwardly away from the central wall 32 of the wrist pin 16, thus drawing oil through the intake passage 28, the intake port 36 and the axial intake passage 34, into the pump chambers 24. During this intake stroke of the pump pistons 26, a portion of the lubricant is diverted into the passages 84 of the guide stems 38 and onto the cylinder wall. After the piston 14 passes top dead center or concurrently therewith, the pump pistons 26 are urged inwardly on their pumping stroke towards the central wall 32. The check valve 30 prevents oil flowing backwardly through the intake passage 28 and the exhaust ports 80 of the wrist pin 16 come into registration with the exhaust passages 78 of the connecting rod 18. Accordingly on the power stroke of piston 14 a stream of pressurized lubricant is deposited on the crank pin bearing through the lower ends of the exhaust passages 78. At the same time, during the initial portion of the pumping stroke of the pump pistons 26, a forceful stream of lubricant is caused to pass outwardly through the guide stem passages 84 and onto the cylinder wall. As is indicated in Figure 3, during the final portion of the pumping stroke of the pump pistons 26 the intake port 86 to the guide stem passages 84 are closed and all of the remaining pressurized lubricant is delivered to the crank pin bearing.

Although I have illustrated and described but a single form of my invention it will be apparent that other modifications can be made by persons skilled in the art without departing from the scope of the invention as expressed in the claims. Therefore I do not wish to be limited to the details of construction herein shown and described but only by the scope and spirit of the following claims.

I claim:

1. In a reciprocating engine with a cylinder, a reciprocatory piston in said cylinder and a connecting rod, the improvement comprising: a hollow wrist pin mounted in said piston and connected to said rod; a pump means in said wrist pin; passage means defining a circuit for a liquid from a source of liquid to at least one surface of said engine through said pump means; and actuating means interconnecting said pump means and said connecting rod to translate relative movement of said piston and said rod into actuation of said pump means for forcing liquid through said passage means.

2. In a reciprocating engine with a cylinder, a reciprocatory piston in said cylinder and a connecting rod, the improvement comprising: a hollow wrist pin mounted in said piston and connected to said rod; means in said wrist pin defining at least one pump chamber and including a movable wall; passage means for a liquid from a source of liquid to at least one surface of said engine through said pump chamber; and actuating means interconnecting said movable wall and said connecting rod to translate relative movement of said piston and said rod into actuation of said movable wall for forcing liquid through said passage means.

3. In a reciprocating engine with a cylinder, a reciprocatory piston in said cylinder and a connecting rod, the improvement comprising: a hollow wrist pin mounted in said piston and connected to said rod; means in said wrist pin defining at least one pump chamber and including a movable wall; passage means defining a circuit for oil from a source of oil to at least one surface of said engine through said pump chamber; and cam means interconnecting said rod and said movable wall to translate relative movement of said piston and said rod into reciprocation of said movable wall for forcing oil through said passage means and pump chamber to said surface.

4. In a reciprocating engine with a cylinder, a reciprocatory piston in said cylinder and a connecting rod, the improvement comprising: a hollow wrist pin mounted in said piston and connected to said rod; means in said wrist pin dividing said wrist pin into a pair of opposite end pump chambers; inlet oil passage means formed in said wrist pin and said connecting rod to communicate said pump chambers with a source of oil; outlet oil passage means adapted to conduct oil from said chambers to at least one surface of said engine; a pair of pump pistons reciprocably slideably mounted in said wrist pin in said pump chambers; and actuating means interconnecting said connecting rod and said pump pistons to translate relative movement of said piston and said rod into axial reciprocation of said pump pistons for forcing oil through said passage means.

5. A device as set forth in claim 4 in which said actuating means is adapted to cause concurrent opposite axial movement of said pump pistons in said pump chambers to cause concurrent oil intake and concurrent oil exhaust movements of said pump pistons, said actuating means also being adapted to effect exhaust movements of said pump pistons during downward movement of said piston in said cylinder.

6. In a reciprocating engine with a cylinder, a reciprocatory piston in said cylinder and a connecting rod, the improvement comprising: a hollow wrist pin mounted in said piston and connected to the upper end of said rod; a pump mechanism in said wrist pin; actuating means interconnecting said pump mechanism and said rod to translate relative movement of said rod and said piston into actuation of said pump mechanism in timed relation to the cycle of said engine whereby the intake of said mechanism is coincident with upward travel of said piston and the exhaust of said mechanism is coincident with the downward travel of said piston in said cylinder; lubricant intake passage means formed in said rod, said wrist pin and said pump mechanism; valve means in said intake passage means adapted to open during upward movement of said piston; lubricant outlet passage means from said pump mechanism to a surface of said engine; and valve means in said outlet passage means adapted to open during downward travel of said piston.

7. In a reciprocating engine with a cylinder, a reciprocatory piston in said cylinder and a connecting rod, the improvement comprising the combination of: a hollow wrist pin mounted in said piston and connected to the upper end of said rod; a central internal wall in said wrist pin dividing said wrist pin into a pair of opposite end pump chambers; a pair of pump pistons axially reciprocably slideably mounted in said pump chambers; cam means interconnecting said pump pistons and said rod to translate relative movement of said rod and piston into concurrent opposite axial reciprocation of said pump pistons; lubricant intake passage means formed in said rod and said wrist pin and communicating with said pump chambers; valve means in said intake passage means adapted to open during upward movement of said piston; lubricant outlet passage means from said pump chambers to a surface of said engine; and valve means in said outlet passage means adapted to open during downward travel of said piston in said cylinder.

8. In a reciprocating engine with a cylinder, a reciprocatory piston in said cylinder and a connecting rod, the improvement comprising the combination of: a hollow wrist pin angularly immovably mounted in said piston and providing a bearing for the upper end of said rod; a central internal wall in said wrist pin dividing said wrist pin into a pair of opposite end pump chambers; a pair of pump pistons axially reciprocably slideably mounted in said pump chambers; cam means including a pair of drive pins carried by said rod and slideable in a pair of slots formed in said wrist pin and having cam engagement means with said pump pistons to translate relative angular movement of said wrist pin and said rod into axial reciprocation of said pump pistons; lubricant intake passage means from said pump chambers formed through said rod and said wrist pin; valve means in said intake passage means adapted to open during upward movement of said piston; lubricant outlet passage means from said pump chambers to a surface of said engine; and valve means in said outlet passage means adapted to open during downward travel of said piston.

9. In a reciprocating engine with a cylinder, a reciprocatory piston in said cylinder, and a connecting rod, the improvement comprising the combination of: a hollow wrist pin angularly immovably mounted in said piston and providing a bearing for the upper end of said rod; a central internal wall in said wrist pin dividing said wrist pin into a pair of opposite end pump chambers; a pair of pump pistons axially reciprocably slideably mounted in said pump chambers; a pair of annular camming members rotatably mounted in opposite ends of said wrist pin coaxially with said pump pistons and having a cam engagement with said pistons to translate rotational movement of said camming members into axial movement of said pump pistons; a pair of drive pins carried by said rod and slideable in a pair of slots formed in said wrist pin and drivingly connected at their inner ends to said annular camming members to translate oscillatory movement of said connecting rod into angular movement of said camming members; and passage means defining a lubricant circuit that includes said pump chambers and at least one bearing surface of said engine.

10. In a reciprocating engine with a cylinder, a reciprocatory piston in said cylinder, a connecting rod and a crank pin connected to said rod, the improvement comprising the combination of: a hollow wrist pin angularly immovably mounted in said piston and providing a bearing for the upper end of said rod; a central internal wall in said wrist pin dividing said wrist pin into a pair of opposite end pump chambers and formed with a pair of guide stems extending outwardly from opposite sides thereof coaxially with said wrist pin; a pair of pump pistons axially reciprocably slideably mounted in said pump chambers and coaxially slideably mounted on said guide stems and keyed to said stems against rotational movement thereabout; a pair of annular camming members rotatably mounted in opposite ends of said wrist pin coaxially with said pump pistons and having a cam engagement with said pistons to translate rotational movement of said camming members into axial movement of said pump pistons; a pair of drive pins carried by said rod and slideable in a pair of slots formed in said wrist pin and having a driving engagement with said annular camming members to translate oscillatory movement of said connecting rod into oscillatory rotational movement of said camming members; lubricant intake passage means formed in said rod and said wrist pin and communicating with said pump chambers; valve means in said intake passage means adapted to open during upward movement of said piston; lubricant outlet passage means from said pump chambers to a bearing surface of said crank pin; and valve means in said outlet passage means adapted to open during downward travel of said piston.

11. A device as set forth in claim 10 in which said outlet passage means include a bore extending longitudinally of said rod and having an opening into a bearing surface for said wrist pin, and said valve means comprises a slot formed in said wrist pin in alignment with the bearing opening of said bore of said rod and movable into and out of registration with said bearing opening during oscillatory movement of said rod relative to said wrist pin and adapted for such registration during downward movement of said piston in said cylinder.

12. In a reciprocating engine with a cylinder, a reciprocatory piston in said cylinder and a connecting rod, the improvement comprising: a hollow wrist pin interconnecting said piston and said rod; a pump means in said wrist pin; passage means defining a circuit for a liquid from a source of liquid to at least one surface of said engine through said pump means; and actuating means interconnecting said pump means and said connecting rod to translate movement of said connecting rod into actuation of said pump means.

References Cited in the file of this patent

UNITED STATES PATENTS

| 1,088,510 | Adams | Feb. 24, 1914 |
| 2,629,639 | Johansen | Feb. 24, 1953 |

FOREIGN PATENTS

| 429,466 | Great Britain | May 30, 1935 |